United States Patent [19]
Crisafulli

[11] 3,851,931
[45] Dec. 3, 1974

[54] REVERSIBLE ENDLESS TRACK FOR VEHICLES

[76] Inventor: Angelo J. Crisafulli, Box 1051, Glendive, Mont. 59330

[22] Filed: Aug. 14, 1973

[21] Appl. No.: 388,208

[52] U.S. Cl. .................................... 305/54, 305/56
[51] Int. Cl. ............................................ B62d 55/08
[58] Field of Search .................... 305/46, 54, 56, 58

[56] References Cited
UNITED STATES PATENTS

| 1,469,001 | 9/1923 | Gentry | 305/58 |
| 2,329,303 | 9/1943 | Stewart | 305/58 |
| 3,416,846 | 12/1968 | Eastman | 305/54 |

*Primary Examiner*—M. Henson Wood, Jr.
*Assistant Examiner*—Gene A. Church
*Attorney, Agent, or Firm*—Clarence A. O'Brien; Harvey B. Jacobson

[57] ABSTRACT

A reversible endless track assembly for use with various types of vehicles and machines having an endless track arrangement incorporating a plurality of pivotally interconnected pads such as found on various earthworking machines, crawler type tractors and the like. The pads are attached to a pair of substantially spaced parallel rails with the rails being pivotally interconnected by pins to enable the rails to engage the various rollers and sprockets. The rails and the connection between the rails and pads are constructed in a manner to enable the pads to be disassembled from the rails, the rails then turned so that the inner edge becomes the outer edge and the pads then reassembled on the rails and the rails reconnected by the pins thereby enabling the endless track to be reversed so that the original outer edges of the rails which have not been worn by engagement with the rollers and sprockets will then be engaged by the rollers and sprockets thereby effectively prolonging the useful life of an endless track assembly thereby materially reducing the cost of maintenance of this area of vehicles of this type.

9 Claims, 4 Drawing Figures

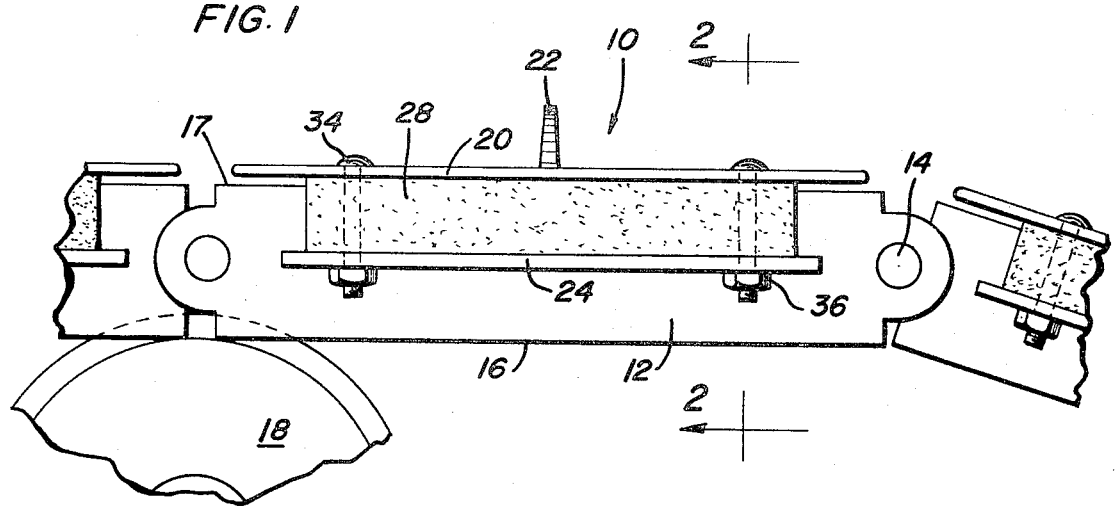
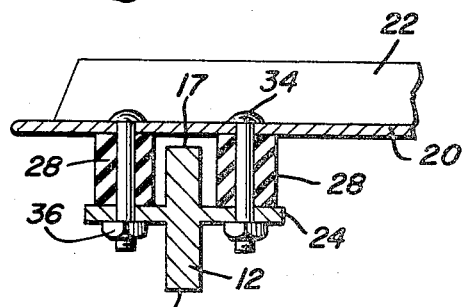
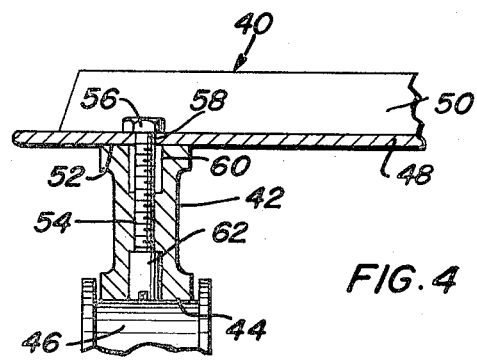
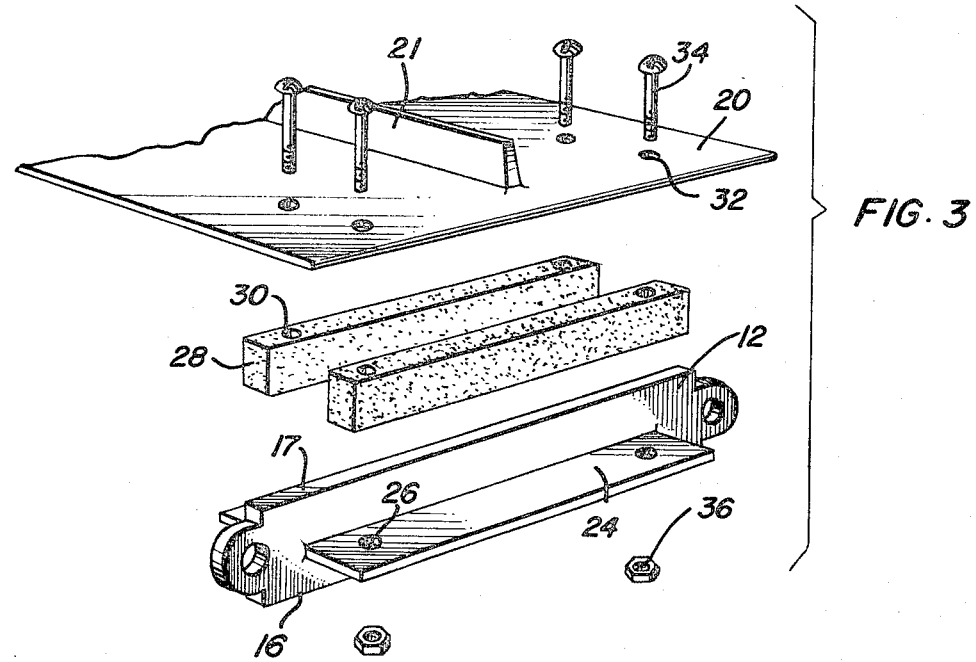

REVERSIBLE ENDLESS TRACK FOR VEHICLES

BACKGROUND OF THE INVENTION

1. Field of the Invention

The present invention generally relates to improvements in the endless track of vehicles of the type employing endless tracks or treads and more particularly to an endless track having the capability of the pivotally interconnecting rails for supporting the ground engaging pads being reversible so that both longitudinal edges of the rails may be used as wear surfaces for engaging the supporting rollers normally provided to support the endless tracks from the vehicle.

2. Description of the Prior Art

Prior U.S. Pat. Nos. 1,469,001, issued Sept. 25, 1923; 2,329,303, issued Sept. 14, 1943 and 3,461,846, issued Dec. 17, 1968 disclose endless track assemblies for use with crawler type tractors or other vehicles in which the components of the track are reversible. However, such previously known devices are rather complex in structure in certain instances and in certain other instances are constructed in a manner that initial wear of the assembly in one position can damage and render difficult to use the components when reversed.

SUMMARY OF THE INVENTION

An object of the present invention is to provide a reversible track assembly for crawler type vehicles in which the rails which engage the rollers and sprockets and support the track pads are reversible so that the original inner edge of each rail which normally engages the rollers and sprockets will be oriented so that the unworn outer edge will become the inner edge and engage the rollers and sprockets with the track pads being detachably connected to the rails.

Another object of the invention is to provide a reversible endless track assembly in accordance with the preceding object in which one form of the invention includes the provision of laterally extending wings or flanges on each rail or link and the track pads are secured to the wings or flanges by bolt assemblies and spacer pads oriented between the inner surface of the pads and the wings or flanges.

A further object of the invention is to provide an endless track assembly as set forth in the preceding objects in which a second embodiment of the invention includes the provision of a mounting bore completely through the link or rail having a countersunk area receiving an elongated bolt which will be worn along with the surface of a link or rail as it engages the rollers or sprockets so that the bolt and elongated nut may be disassembled to remove the pads and reverse the links or rails.

Yet another object of the invention is to provide a reversible endless track assembly in accordance with the preceding objects which is simple, long lasting and dependable in construction, enables easy reversibility and effectively prolongs the useful life of the endless track assembly.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a side elevational view of a portion of an endless track assembly illustrating the association of the endless track components of the present invention.

FIG. 2 is a detailed sectional view taken substantially upon a plane passing along section line 2—2 of FIG. 1 illustrating the structural details of the components of the endless track assembly of FIG. 1.

FIG. 3 is an exploded group perspective view of the components of the assembly illustrated in FIGS. 1 and 2.

FIG. 4 is a detailed sectional view similar to FIG. 2 but illustrating another embodiment of the invention.

DESCRIPTION OF THE PREFERRED EMBODIMENTS

Referring now specifically to the drawings, the endless track assembly of the present invention is generally designated by reference numeral 10 and includes a plurality of pairs of rails or links 12 which are pivotally interconnected by connecting pins 14 one of which is a master pin which may be easily removed to enable easy disassembly and assembly of the endless track in a well known manner. The links 12 have inner edge surfaces 16 which engage supporting idler rollers 18, sprockets or the like in a conventional manner. The connecting pins 14 are also conventional and the inner edge surfaces 16 of the links 12 receive substantial wear along with the pins and bushings therefor and when such wear becomes excessive, it is necessary to replace the links.

Each pair of links 12 support a track pad or plate 20 which has a cleat or rib 22 on the outer surface thereof or the plate or pad may be flat or otherwise constructed in a conventional manner. It is an important part of the present invention to provide a structure so that the track pad is separable from the links 12 with it being understood that the links 12 are supported at each end edge portion of the pad 20 or in some instances, more than two links support each pad.

In the embodiment of the invention illustrated in FIGS. 1-3, each of the links 12 is provided with a pair of laterally extending wings or flanges 24 in the central longitudinal portion thereof as illustrated specifically in FIGS. 2 and 3 with the flanges 24 being of unitary construction with the links 12 and including an aperture or hole 26 adjacent each end thereof. Positioned longitudinally against the upper surface of each of the flanges 24 is a spacer block 28 having an aperture or hole 30 at each end thereof for alignment with corresponding apertures and holes 32 in the track pad or plate 20. Bolts 34 extend through the apertures 32 in the track pads 20, the apertures 30 in the spacer pads 28 and the apertures 26 in the flanges 24 with suitable anchoring nuts 36 screw threaded thereon against the undersurface of the flanges 24 thereby removably but securely and rigidly mounting the track pads 20 detachably to the links 22 with the spacer pads 28 enabling some limited degree of resilient movement of the track pads in relation to the flanges 24 with the pads 20 being slightly spaced from the upper edges of the links 12 when assembled.

In this arrangement, when wear on the inner edge 16 of the links 12 occurs, it is only necessary to remove the bolt and nut assemblies 34 and 36 thus separating the track pads 20 and spacer blocks 28 from the links 12. Then, the master pin 14 may be removed and the links 12 turned inside out so that the original and worn inner edges 16 will then be disposed outwardly and the unworn outer edges 17 of the links 12 will then be engaged by the rollers 18. The master pin 14 is replaced and the track pads 20 reassembled onto the flanges 24. It will be appreciated that the links and track pads may be assembled prior to insertion of the master pin or after insertion of the master pin and the assembly may be disassembled in any desired sequence.

The embodiment illustrated in FIG. 4 includes an endless track assembly generally designated by numeral 40 which includes a plurality of links 42 that are pivotally interconnected by pins and are of generally elongated rectangular configuration generally similar to the links 12 illustrated in FIG. 1. In this embodiment of the invention, the inner surface of the link is designated by reference numeral 44 and engages the roller 46 in the same manner as illustrated in connection with the assembly of FIG. 1. The track pad 48 includes a cleat 50 thereon and includes holes aligned with the link 42. As illustrated, the link 42 is somewhat thicker than the link 12 although the dimensions thereof may vary. Extending vertically through the link 42 from the inner surface 44 to the outer surface 52, there is provided a vertical bore 54 receiving a bolt 56 which also extends through the corresponding hole or aperture 58 in the track pad 48. The bore 54 is provided with a counterbore 60 at both the inner and outer ends thereof for receiving an elongated nut 62 which terminates flush with the inner surface 44 of the link 42 when the bolt 56 is assembled to retain the track pad 48 fixed to the outer surface of the link 42. As the inner surface of the link 42 along with the inner end of the nut 62 is worn due to its contact with the rollers 46 and sprocket wheels, all of the surface area including the nut 62 will be worn an equal amount so that the bolt 56 can be removed whenever desired and the nut 62 can be easily removed from the counterbore. Then, by reversing the link 42, the worn nut 62 may be inserted into the bore 60 formerly communicated with the upper edge 52 so that the upper edge 52 may then be oriented in engagement with the roller 46 and the bolt 56 will extend through the track pad 48 to retain the track pad on the link 42 after the link has been reversed. Thus, the wear on the link will not adversely effect the disconnection between the securing bolt and the link 42. The bore and corresponding nut may be cylindrical or polygonal in cross-sectional configuration or the nut 62 may be provided with suitable means to enable it to be locked from turning. For example, a transverse kerf could be provided in the outer end thereof for receiving a suitable implement such as a large screwdriver for preventing it from turning while the bolt 56 is being tightened or loosened.

It is pointed out that the endless track assemblies may be of any conventional construction including metal, rubber or any combination of materials with it being merely necessary to unbolt the track pads from the rails or links, pull the master pin, turn the rail inside out and put the master pin back in. In this process, the pins 14 and bushings therefor have been turned over and also a new surface of the rail engages the rollers. The pads are then reattached to the rails and in the form of the invention illustrated in FIGS. 1–3, the spacer pads, of course, are inserted between the track pads and the flanges 24. This arrangement eliminates the necessity of having to press out each individual pin and bushing and replace the pins or bushings or turn them over and reassemble them into the rails. Even when this is done, the rails are still worn on the inner surface which requires frequent replacement of the rails and track pads which are normally fixed or integral therewith or secured thereto by bolts extending into screw-threaded sockets formed in the rails or links. In the assembly of FIG. 4, where the link 42 normally is provided with a screw-threaded socket into the outer edge thereof, the hole is extended throughout the vertical extent of the link and counterbored at each edge thereof so that the long nut will engage the roller and wear with the rail and still not come loose because of its length. The long nut wears out with the rail and keeps the hole or countersink in the bore from becoming closed because of its engagement with the rollers. The procedure in connection with this embodiment of the invention is substantially the same and this would permit the use of present track pads and rails and would involve only a matter of drilling the presently available rails completely through and countersinking each end of the bore and providing the elongated nut so that it is substantially flush with the surface of the rail. Longer bolts may be necessary for utilizing the structure in FIG. 4 as compared with the present bolts that secure the track pads to the rails.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. An endless track assembly for crawler type tractors of the type having supporting rollers and the like comprising a pair of substantially parallel links adapted to be pivotally connected to form an endless track chain, a track pad connected with each pair of links, and means removably connecting the track pads to the links to enable the links to be reversed and the endless track chain to be turned inside out, said means connecting the pad to the links including fastening means connected with the pad and connected with the links from either longitudinal edge of the links with equal facility whereby the links may be connected to the pads with either edge facing the supporting rollers for the track assembly, each link being provided with a longitudinally extending flange along each side thereof, said fastening means including bolts extending through each flange on each link and through the track pad, and spacer blocks disposed between the flanges and pads.

2. The structure as defined in claim 1 wherein said spacer blocks are continuous throughout the length of the link and constructed of resilient material and having a height slightly greater than the distance from the flange to the longitudinal edge of the link thereby spacing the track pads slightly from the edge of the link.

3. The structure as defined in claim 2 wherein said flanges are of unitary construction with the link and extend substantially throughout the length thereof, said spacer blocks being commensurate in length to the flanges.

4. An endless track assembly for crawler type tractors of the type having supporting rollers and the like comprising a pair of substantially parallel links adapted to be pivotally connected to form an endless track chain, a track pad connected with each pair of links, and means removably connecting the track pads to the links to enable the links to be reversed and the endless track chain to be turned inside out, said means connecting the pad to the links including fastening means connected with the pad and connected with the links from either longitudinal edge of the links with equal facility whereby the links may be connected to the pads with either edge facing the supporting rollers for the track assembly, each of said links including a plurality of bores extending from the inner edge to the outer edge thereof, said fastening means including a bolt extending through the pad and through the bore in the link, said bore being countersunk on each end thereof, said bolt including an elongated nut received in the countersunk portion of the bore whereby the end of the elongated nut will terminate flush with the surface of the link.

5. The structure as defined in claim 4 wherein said bore in the link is disposed along the centerline thereof with the bolt extending through the bore securing the pad directly to the edge surface of the link with the other edge surface of the link adapted to engage a track supporting roller and the like.

6. A link adapted to be pivotally connected together in an end to end manner to form a track chain and adapted to support track pads, said link including an elongated rigid member having parallel longitudinal edges, one of said edges adapted to engage a supporting structure for the track chain, said rigid member including means for connecting a track pad in overlying relation to either longitudinal edge of the link with equal facility thereby enabling either edge of the link to engage a supporting structure so that both edges of the link become wear surfaces, said means including bores extending between the longitudinal edges for receiving pad mounting bolts, each end of each bore being counterbored to receive a nut on the bolt whereby the nut will wear along with the adjacent longitudinal edge of the link.

7. A link adapted to be pivotally connected together in an end to end manner to form a track chain and adapted to support track pads, said link including an elongated rigid member having parallel longitudinal edges, one of said edges adapted to engage a supporting structure for the track chain, said rigid member including means for connecting a track pad in overlying relation to either longitudinal edge of the link with equal facility thereby enabling either edge of the link to engage a supporting structure so that both edges of the link become wear surfaces, said means including an elongated flange extending laterally from the link centrally between the longitudinal edges, and a spacer block engaging the surface of the flange facing a track pad, said flange and spacer block adapted to receive pad mounting bolts.

8. The structure as defined in claim 7 wherein both sides of the link include a flange and spacer block, said blocks being of resilient material and dimensioned to extend slightly beyond the adjacent longitudinal edge to space the pads from the edges of the links.

9. A link adapted to be pivotally connected together in an end to end manner to form a track chain and adapted to support track pads, said link including an elongated rigid member having parallel longitudinal edges, one of said edges adapted to engage a supporting structure for the track chain, said rigid member including means for connecting a track pad in overlying relation to either longitudinal edge of the link with equal facility thereby enabling either edge of the link to engage the supporting structure for the track chain so that both edges of the link become wear surfaces, said means including flange means rigid with said link and projecting laterally outwardly therefrom equally between the longitudinal edges, said flange means including openings adapted to removably receive track pad mounting bolts therethrough for removably securing a track pad to the link.

* * * * *